(12) United States Patent
Prakash et al.

(10) Patent No.: US 6,686,956 B1
(45) Date of Patent: Feb. 3, 2004

(54) INCREASED RESOLUTION DIGITAL CAPTURE DEVICE

(75) Inventors: Ravinder Prakash, Concord, NC (US); Paul Hakenewerth, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,540

(22) Filed: Aug. 31, 1999

(51) Int. Cl.[7] .................. H04N 5/228; H04N 5/225
(52) U.S. Cl. .................. 348/218.1; 348/208.99; 348/373
(58) Field of Search .................. 348/218.1, 208.99, 348/373

(56) References Cited

U.S. PATENT DOCUMENTS

| | | | |
|---|---|---|---|
| 4,103,109 A | 7/1978 | Maeding | 179/15 |
| 4,383,170 A | 5/1983 | Takagi | 250/216 |
| 4,516,032 A | 5/1985 | Barr | 250/578 |
| 4,920,418 A | 4/1990 | Robinson | 358/213.28 |
| 5,402,171 A * | 3/1995 | Tagami et al. | 348/219.1 |
| 5,449,898 A | 9/1995 | Dosmann | 250/208.1 |
| 5,502,578 A | 3/1996 | Smitt | 358/474 |
| 5,541,653 A | 7/1996 | Peters | 348/264 |
| 5,734,414 A * | 3/1998 | Nishimura et al. | 348/14.05 |
| 5,734,417 A * | 3/1998 | Yamamoto et al. | 348/61 |
| 5,757,423 A * | 5/1998 | Tanaka et al. | 348/218.1 |
| 5,771,123 A | 6/1998 | Hamano | 359/557 |
| 5,880,778 A * | 3/1999 | Akagi | 348/218.1 |
| 5,907,353 A * | 5/1999 | Okauchi | 348/218.1 |
| 5,930,405 A * | 7/1999 | Chida | 382/284 |
| 6,018,363 A * | 1/2000 | Horii | 348/219.1 |
| 6,256,066 B1 * | 7/2001 | Yukawa et al. | 348/340 |
| 6,266,086 B1 * | 7/2001 | Okada et al. | 348/218.1 |
| 6,429,895 B1 * | 8/2002 | Onuki | 348/208.99 |

* cited by examiner

Primary Examiner—Wendy R. Garber
Assistant Examiner—James Hannett
(74) Attorney, Agent, or Firm—Karl O. Hesse; Norman L. Gundel

(57) ABSTRACT

A workstation having low resolution and high resolution image capture apparatus such as is useful for teleconferencing. Optical wedge apparatus is placed between an object and a focusing lens according to the invention to create multiple overlapping low resolution images of a whole object. Programmed or hardwired logic is then used to construction a high resolution image of the object by interleaving the picture elements of the low resolution images.

3 Claims, 10 Drawing Sheets

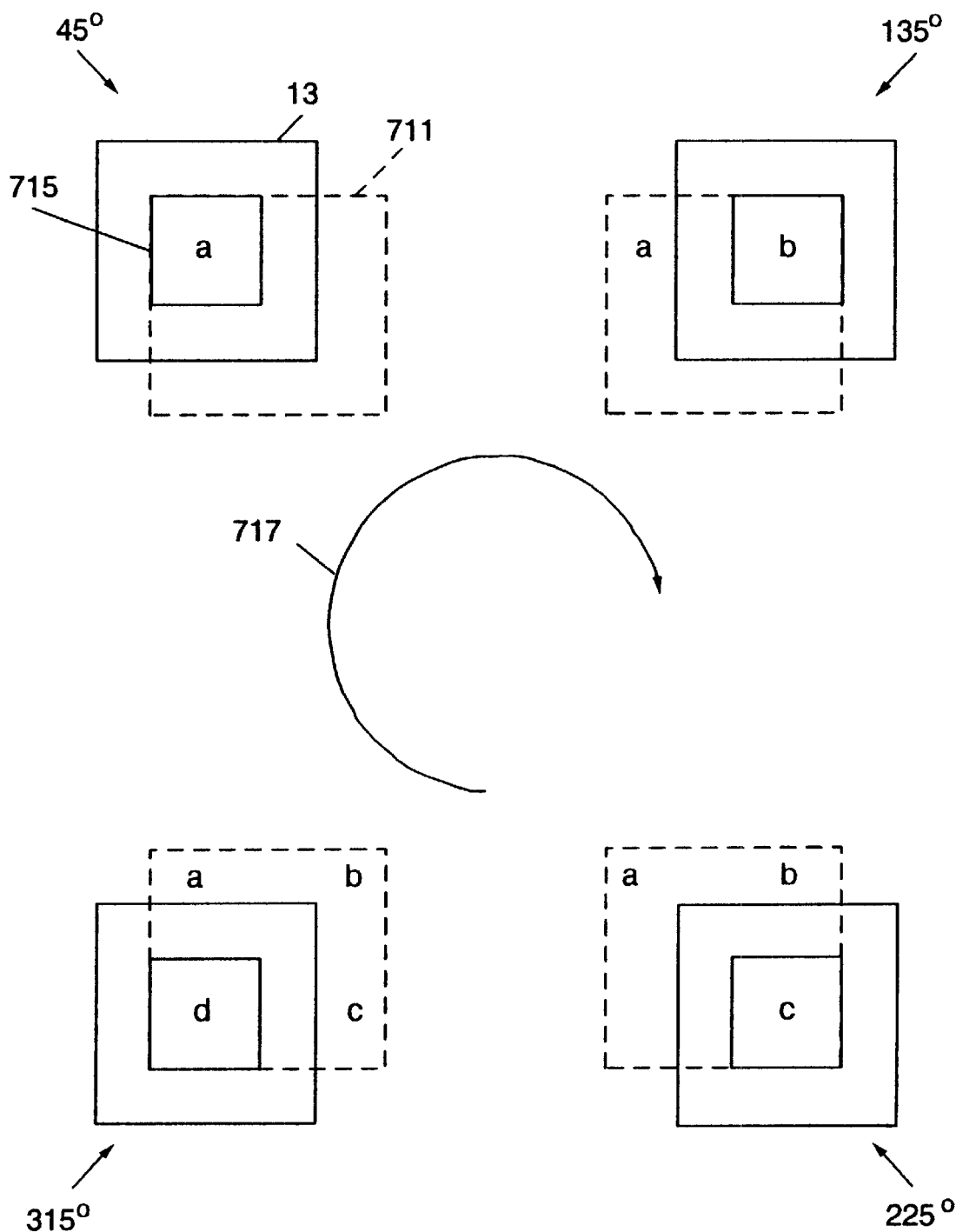

FIG. 12

| a1 | b3 | a2 | b4 | a3 | b5 | a4 | b6 | a5 | b7 | a6 | b8 |
|---|---|---|---|---|---|---|---|---|---|---|---|
| d17 | c19 | d18 | c20 | d19 | c21 | d20 | c22 | d21 | c23 | d22 | c24 |
| a9 | b11 | a10 | b12 | a11 | b13 | a12 | b14 | a13 | b15 | a14 | b16 |
| d25 | c27 | d26 | c28 | d27 | c29 | d28 | c30 | d29 | c31 | d30 | c32 |
| a17 | b19 | a18 | b20 | a19 | b21 | a20 | b22 | a21 | b23 | a22 | b24 |
| d33 | c35 | d34 | c36 | d35 | c37 | d36 | c38 | d37 | c39 | d38 | c40 |
| a25 | b27 | a26 | b28 | a27 | b29 | a28 | b30 | a29 | b31 | a30 | b32 |
| d41 | c43 | d42 | c44 | d43 | c45 | d44 | c46 | d45 | c47 | d46 | c48 |
| a33 | b35 | a34 | b36 | a35 | b37 | a36 | b38 | a37 | b39 | a38 | b40 |
| d49 | c51 | d50 | c52 | d51 | c53 | d52 | c54 | d53 | c55 | d54 | c56 |
| a41 | b43 | a42 | b44 | a43 | b45 | a44 | b46 | a45 | b47 | a46 | b48 |
| d57 | c59 | d58 | c60 | d59 | c61 | d60 | c62 | d61 | c63 | d62 | c64 |

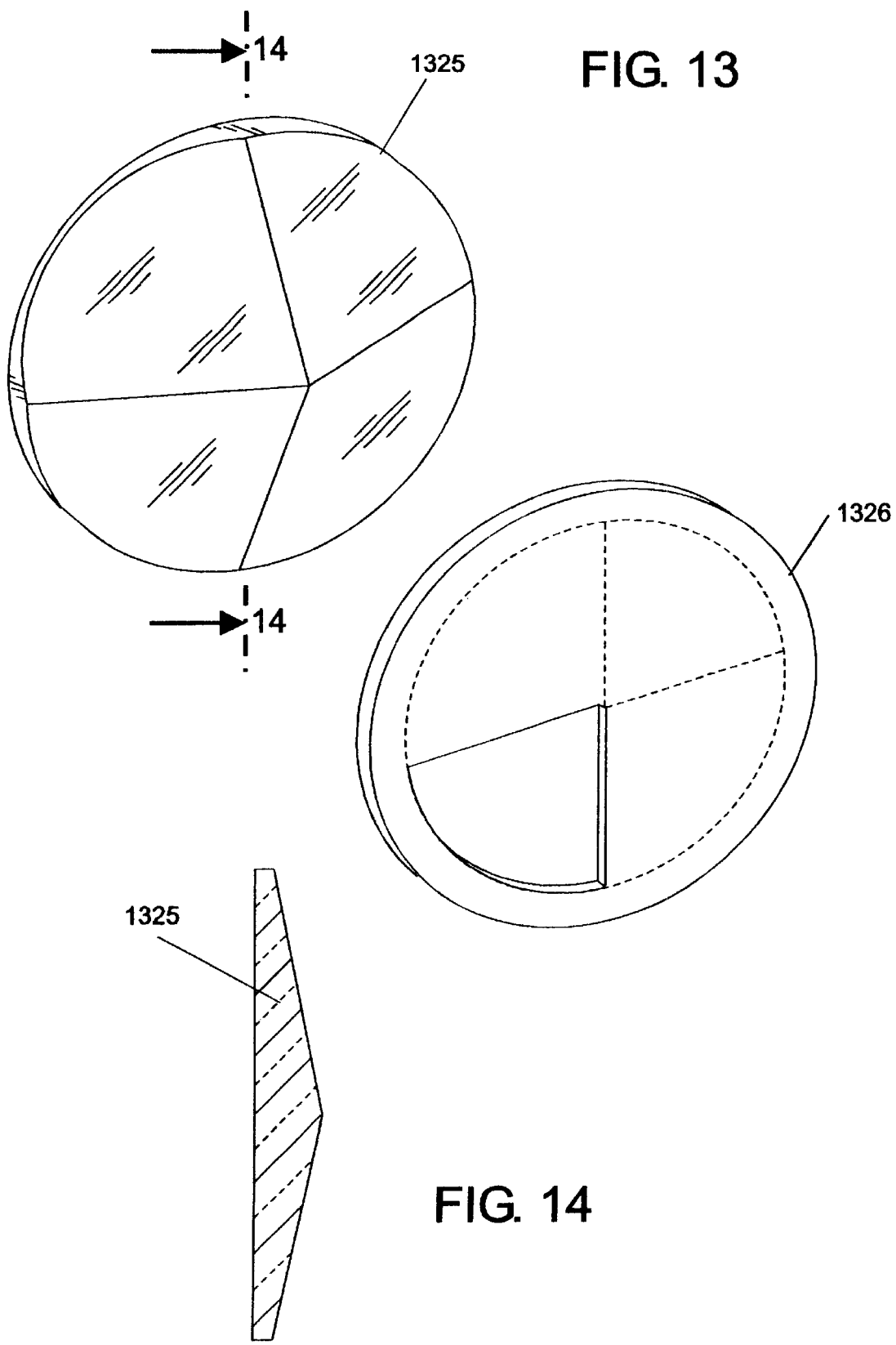

though the instant invention finds utility.

INCREASED RESOLUTION DIGITAL CAPTURE DEVICE

BACKGROUND OF THE INVENTION

1. Field of the Invention

The present invention relates to a method and apparatus for enhancing the resolution of digital image capture devices such as CCD scanners and digital cameras. More particularly, the present invention relates to a method and apparatus which multiplexes picture elements.

2. Description of Related Art

There has been a continuing need in the art of image capture to increase the resolution of a captured image without significantly increasing the cost and complexity of the image capture apparatus. An example of an application where increased resolution is often desirable is in teleconferencing. A low resolution image of the face of a conference participant is usually adequate for effective communication. However, where a document or an article exhibit is to be shared in a tele-conference, much higher resolution of the text or article details are usually desired. Accordingly there is a need for an effective means and method of increasing resolution without significantly increasing cost and complexity at either end of the conference.

U.S. Pat. No. 4,103,109 relates to the multiplexing of image picture elements from a parallel CCD capture array onto a single output line in a more efficient way. This reference does not improve the resolution of the image captured by the CCD array.

U.S. Pat. No. 5,541,653 issued to Peters et al. relates to increasing resolution of digital color images using a beam splitter on the image side of the lens to create multiple offset images which are later combined electronically to create an image of "enhanced resolution". A major disadvantage of the system of Peters is the need for high precision in the beam splitter and its placement. As a result of the requirement for high precision, commercial application of the technique of Peters is costly.

U.S. Pat. No. 5,502,578 issued to Smitt relates to an optical scanner having a variable apparent resolution. The varying resolution is obtained by varying the pixel and line sampling clock rates at differing amounts. The distances between CCD elements is fixed however and therefore actual sampling resolution must be fixed in this teaching.

U.S. Pat. No. 4,920,418 issued to Robinson relates to a scanning imaging system that includes an image shifting means between the lens and a CCD array. The image shifter which may be a rotatable glass plate driven by a piezoelectric bimorph, shifts an image of the object by less than the distance between adjacent PELS at the image plane. As a result of placement of the shifting device on the image side of the lens, expensive parts of close tolerances are required. Accordingly these systems have not achieved wide commercial success.

U.S. Pat. No. 5,449,898 issued to Dosmann relates to a test strip color and/or reflectance analyzer used in the field of clinical chemistry. The equipment of Dosmann is not increasing the resolution of an meaningful image but is detecting the existence of certain colors or reflectance with increased resolution. Accordingly, Dosmann is not concerned with the problem of how to combine or stitch together the partial fields 50a and 50b into a meaningful image. If Dosmann looks at a one half inch overlap field more than once to detect the presence of a color, it does not adversely affect the resultant analysis. On the other hand, when an overlap occurs while capturing a meaningful image, it is a complex task to eliminate the overlap and stitch the parts of the image back together.

U.S. Pat. No. 4,383,170 issued to Takagi et al. and U.S. Pat. No. 4,516,032 issued to Barr relate to similar image subarea capture methods. Here again it is a complex task to eliminate overlap or gaps between sub-areas and stitch the sub-areas of the image back together.

U.S. Pat. No. 5,771,123 issued to Hamano relates to a variable angle optical wedge in a zoom lens for compensating for hand tremors of a photographer. A variable angle optical wedge provides compensating displacement of the image to obtain a more stable image but does not yield a higher image resolution in terms of PEL density.

SUMMARY OF THE INVENTION

An advantage of the present invention is that an inexpensive low resolution camera can be externally fitted with the means of the invention to provide higher resolution image capture of text and exhibit details without complex image stitching or edge matching.

A further advantage of the invention is that object distances and magnifying lenses need not be altered in order to achieve higher resolution.

A still further advantage is that small easily controlled light ray deflections are used in the invention and therefore angular distortion is minimized.

An even further advantage of the invention is that partial images of-an object are avoided and therefore, there is no need for complex edge matching or stitching of partial images These and other advantages which will become apparent from a study of the specification and drawings are obtained by the instant invention through the use of a unique combination of optical and electronic means. Optical wedge action is used in the invention to create multiple overlapping low resolution images of a whole object. Electronic means are then used to construction a high resolution image of the object by interleaving the picture elements of the low resolution images.

BRIEF DESCRIPTION OF THE DRAWINGS

FIG. 7. is a diagram showing portions of an image with simple interleaving.

FIG. 12. shows the interleaving of a, b, c and d picture elements captured with a larger angle optical wedge.

FIG. 13. is a perspective view of optical wedges and shutters.

FIG. 14. is a side view of the optical wedges.

DESCRIPTION OF THE PREFERRED EMBODIMENT

Figure 1:
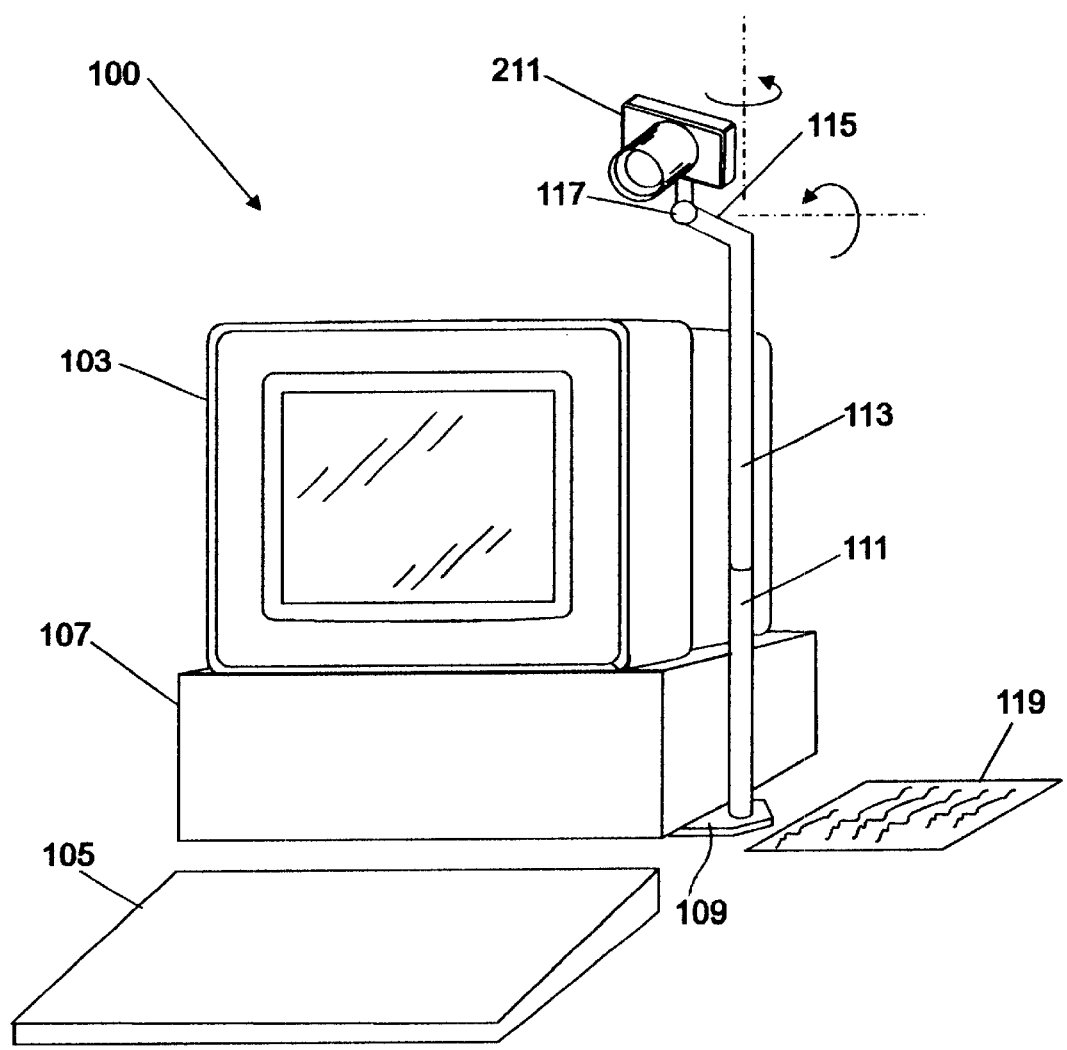
FIG. 1. shows a tele-conferencing camera in which the instant invention finds utility.

With reference to FIG. 1, a teleconferencing application of the preferred embodiment of the invention will now be described. A workstation 100 has a display 103, a keyboard 105 and a computer 107. A stand 109 is placed under the computer 107 which helps to hold the stand 109 in place. Stand 109 includes a tubular upright member 111 into which a second tubular member 113 is inserted for rotatable support. The second tubular member 113 has an angled neck 115 and a joint 117 at it's upper extremity. A digital camera 200 is mounted to the joint 117 as shown for capturing an image of the workstation operator as part of a teleconference. The second tubular member 113, being free to rotate within tubular member 111 allows the camera 211 to be rotated counter clockwise on it's stand 109 to a position placing camera 200 substantially over a document 119 which is to be transmitted as a digital image in a teleconference. Joint 117 allows camera 200 to be rotated downward so as to be able to capture an image of document 119 in a horizontal plane of the table top or other support surface for the workstation 100. When rotated counter clockwise and downward, the camera 200 is switched to it's high resolution mode for capturing the text of the document 119 in a most legible form for reading by other teleconference participants.

Figure 2:
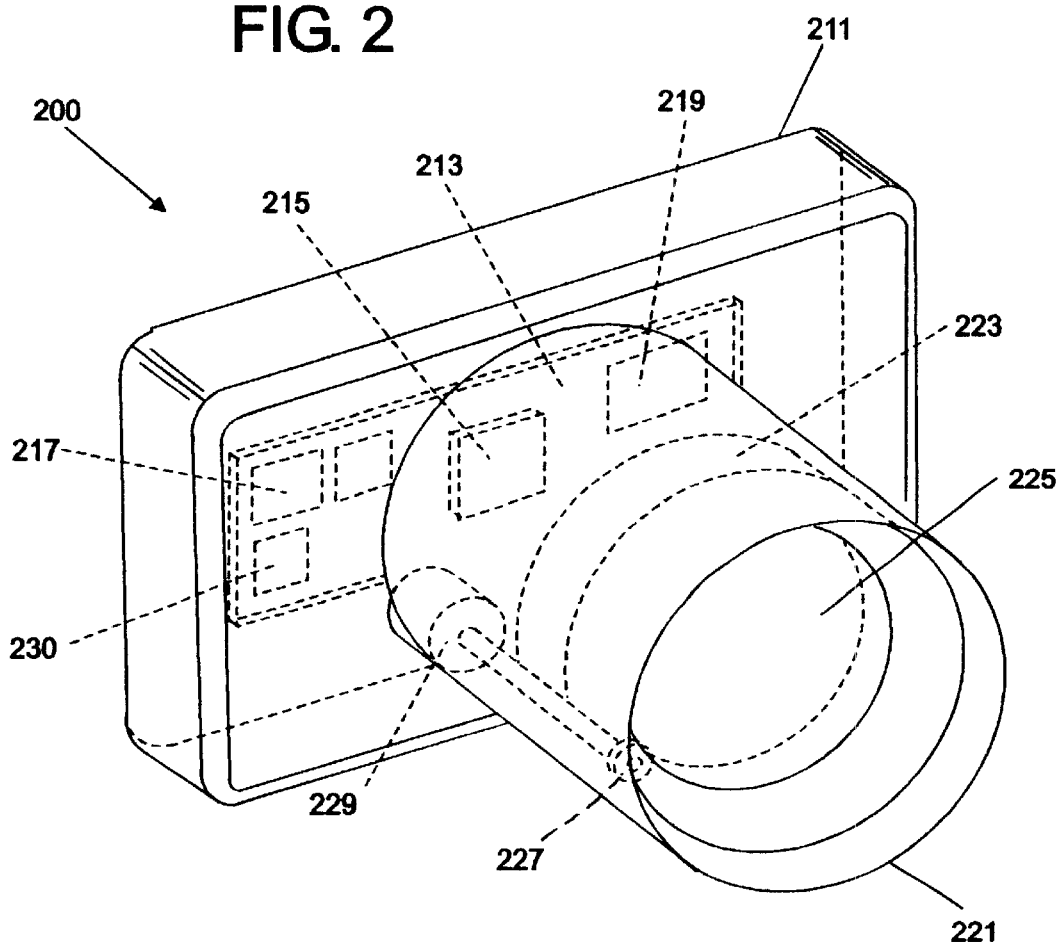
FIG. 2. is a more detailed block diagram of a camera according to the invention.

FIG. 2 shows a more detailed diagram of digital camera 200 according to the invention. Camera 200 has a body 211. Mounted within the body is a circuit board 213. Circuit board 213 carries a charge coupled diode (CCD) array 215, memory modules 217 and logic 219 which may be hard-wired logic or a digital processor programmed by one of the memory modules in the form of a read only memory. It will be understood that the read only memory can also be embodied into the same integrated circuit substrate and the logic 219. Mounted in front of CCD array 215 is a lens body 221 having a lens assembly 223 which focuses an image of an object in front of the lens onto CCD array 215.

In front of the lens assembly 223, lens body 221 also contains an optical wedge assembly 225, including an optical wedge mounted in a ring gear having bearing surfaces engaging a ring track allowing the wedge 225 to be rotated continuously.

Figure 3:
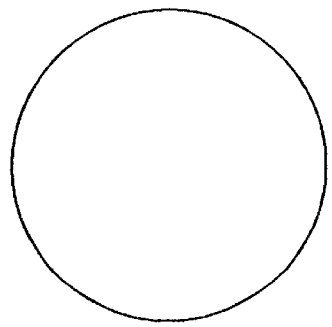
FIG. 3. is a front view of an optical wedge.
Figure 4:
FIG. 4. is a side view of the optical wedge.

FIG. 3 shows a front view of the optical wedge 225 and FIG. 4 is a side view of optical wedge 225.

A pinion gear 227 engages the ring gear. Pinion 227 is mounted on an elongated shaft of motor 229. Motor 229 may be a stepping motor which, with it's control circuits 230 on board 213, is part of an actuator assembly that can be controlled to rotate optical wedge 225 in ninety degree increments. In other embodiments, other means such as a geneva drive or other equivalent means may be employed to actuated the wedge in substantially ninety degree increments.

In another preferred embodiment, the wedge 225 is rotated continuously and the logic 219 resets and samples CCD array 215 in narrow time slots during which wedge 225 is substantially ninety degrees from its position during the previous sample.

Wedge 225 continues to rotate and therefore the mechanics are simpler and cheaper while the CCD reset and sample electronics are inexpensively embodied in read only memory and implemented by the processor in logic module 219.

Figure 5:
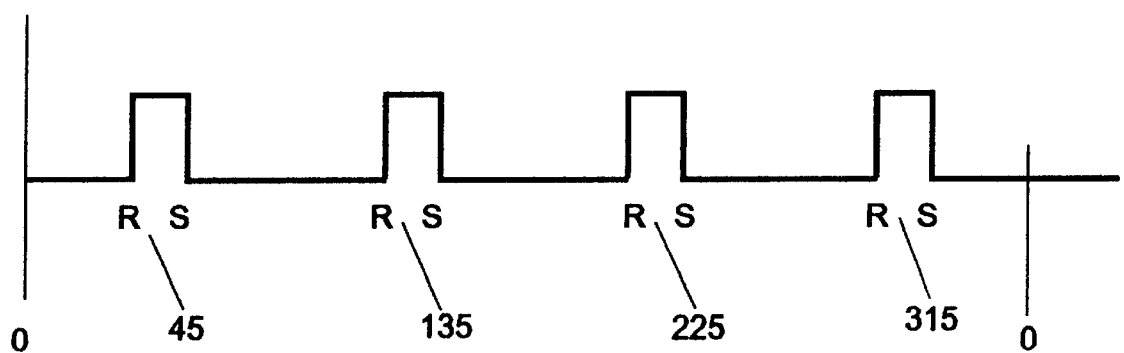
FIG. 5. is a timing diagram.

FIG. 5 shows the relationship between optical wedge angle and reset/sample times as the wedge is continuously rotated. The CCD array is reset for example when the position of the wedge reaches forty degrees and light is integrated in the CCD until the wedge reaches fifty degrees at which time, the charge accumulated in the CCD array is sampled out into a shift register, thereby allowing each sensor of the CCD array to capture a picture element (PEL) labeled a. Likewise, when the wedge has reached one hundred thirty degrees, the CCD array is again reset as indicated by the label R on the X axis of FIG. 5. Upon reaching one hundred forty degrees, the CCD array is sampled as indicated by the label S, thereby allowing each sensor of the CCD array to capture a picture element (PEL) labeled b. These steps are repeated at two hundred twenty, three hundred ten, and at two hundred thirty, three hundred twenty respectively to capture PELs c and d of the image as it is shifted on the plane of the CCD array.

It is understood that the image is shifted around on the CCD array with the array held stationary. Further, it is understood that an optical wedge does not rotate the image itself but merely shifts it while the image itself remains in the same upright or inverted orientation in which it is formed by lens 223.

Figure 6:
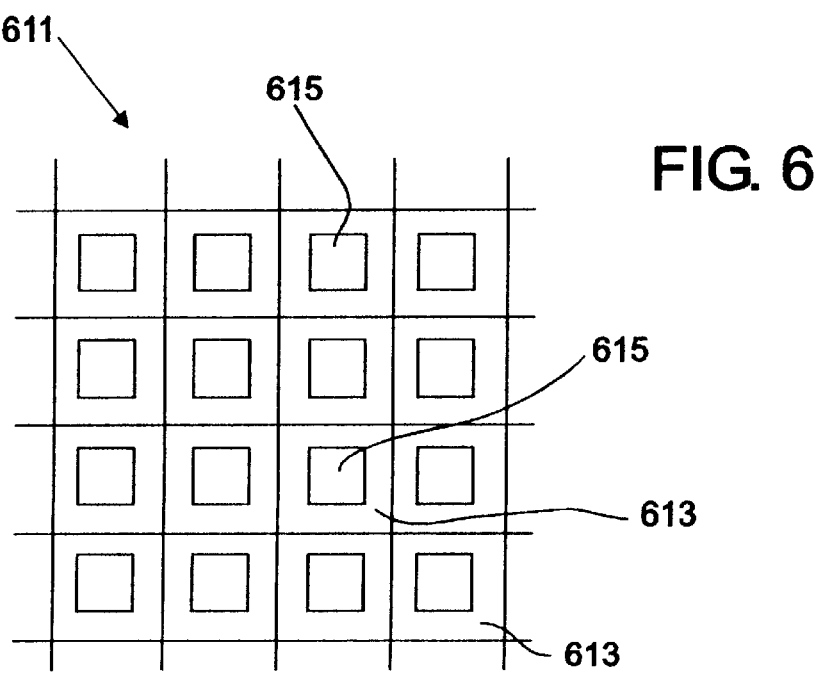
FIG. 6. shows a CCD array of CCD cells and sensitive areas.

We will now consider the various positions on the image that are sampled by an example sensor as the wedge is rotated. A portion 611 of a CCD array is shown in FIG. 6. The-sensitive portion 615 of each CCD cell does not extend all the way to the CCD cell boundary 613 but only occupies the central twenty five percent of the total area within a CCD cell. Without the wedge of the invention being placed between the object and the lens, the sensor would sample only the central 25 percent of an image area since the image area would be stationary on the CCD array. However when the image of the object is shifted downward to the right by the wedge at approximately forty five degrees, as shown for one CCD: cell in FIG. 7, the sensitive portion 711 of each cell 713 samples a portion labeled a of the image 711 at an upper left corner of each cell. These samples labeled a are stored in a memory area for later interleaving with samples b, c and d. When the optical wedge is rotated to approximately one hundred thirty five degrees, as indicated by arrow 717, each sensor samples the portions of the image labeled b, which are also captured. At approximately two hundred twenty five degrees, each sensor samples for capture, the portions of the image labeled c. Likewise, at approximately three hundred fifteen degrees, each sensor samples the portions of the image labeled d. In this way from FIG. 7, it can be seen that when they are later interleaved, the resolution of the combined four images captured by each CCD cell is four times as high as that which would be captured by the CCD cell without the rotating optical wedge.

In the example of FIG. 7, the image has been shifted by less that the spacing between CCD cells so the interleaving of the four captured images into one high resolution image is simple. The same cell generates a, b, c and d picture elements and therefore no cropping of the captured images a, b, c and d are required. However, there are implementation considerations wherein it is difficult to accurately fabricate an optical wedge of very small angle, while it is easier to accurately fabricate an optical wedge of a larger angle. In this case, the image on the plane of the CCD array would be deflected by more than the distance between adjacent CCD cells. Larger deflections require more complex interleaving logic but such incremental complexity in logic is nearly cost free and therefore is an alternate embodiment of the instant invention., and is shown in FIGS. 8, 9, 10, 11 and 12.

Figure 8:
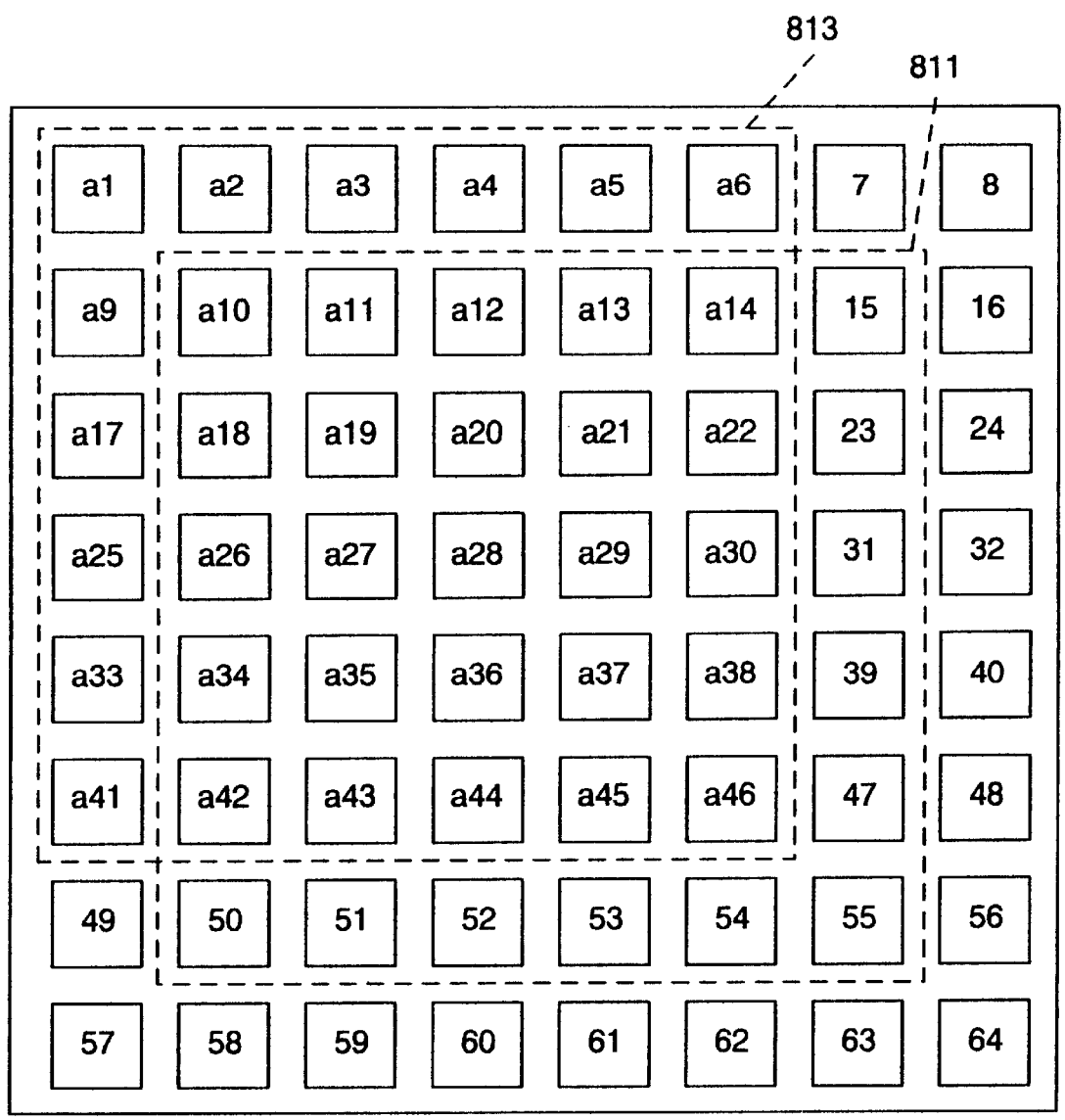
FIG. 8. is a diagram of an eight by eight array of CCD cells and unshifted and shifted image location.

FIG. 8 is a diagram of an eight by eight array of CCD cells which are numbered one through sixty four. Without being shifted, an image formed on the CCD array by lens 223 will be centered on the array as shown by broken line 811. When the image is shifted by optical wedge 225, the image takes the position shown by broken line 813. In this embodiment, the image is shifted by three quarters of the diagonal spacing between adjacent CCD cells. This distance can be described as an integer multiple of the diagonal spacing between adjacent CCD cells minus a fraction of the diagonal spacing between adjacent CCD cells. It will be understood that this description of the amount of initial shift also describes the case where the total shift is only one quarter of the unshifted position as is the case in the embodiment of FIG. 7 and further accounts for the fact that in FIG. 7, the shift is down and to the right whereas in the embodiment of FIG. 8, the shift is upward and to the left. This is because in FIG. 7, the integer is zero and the distance becomes a negative number whereas in FIG. 8, the integer is one which leaves a positive distance of three quarters.

Figure 9:
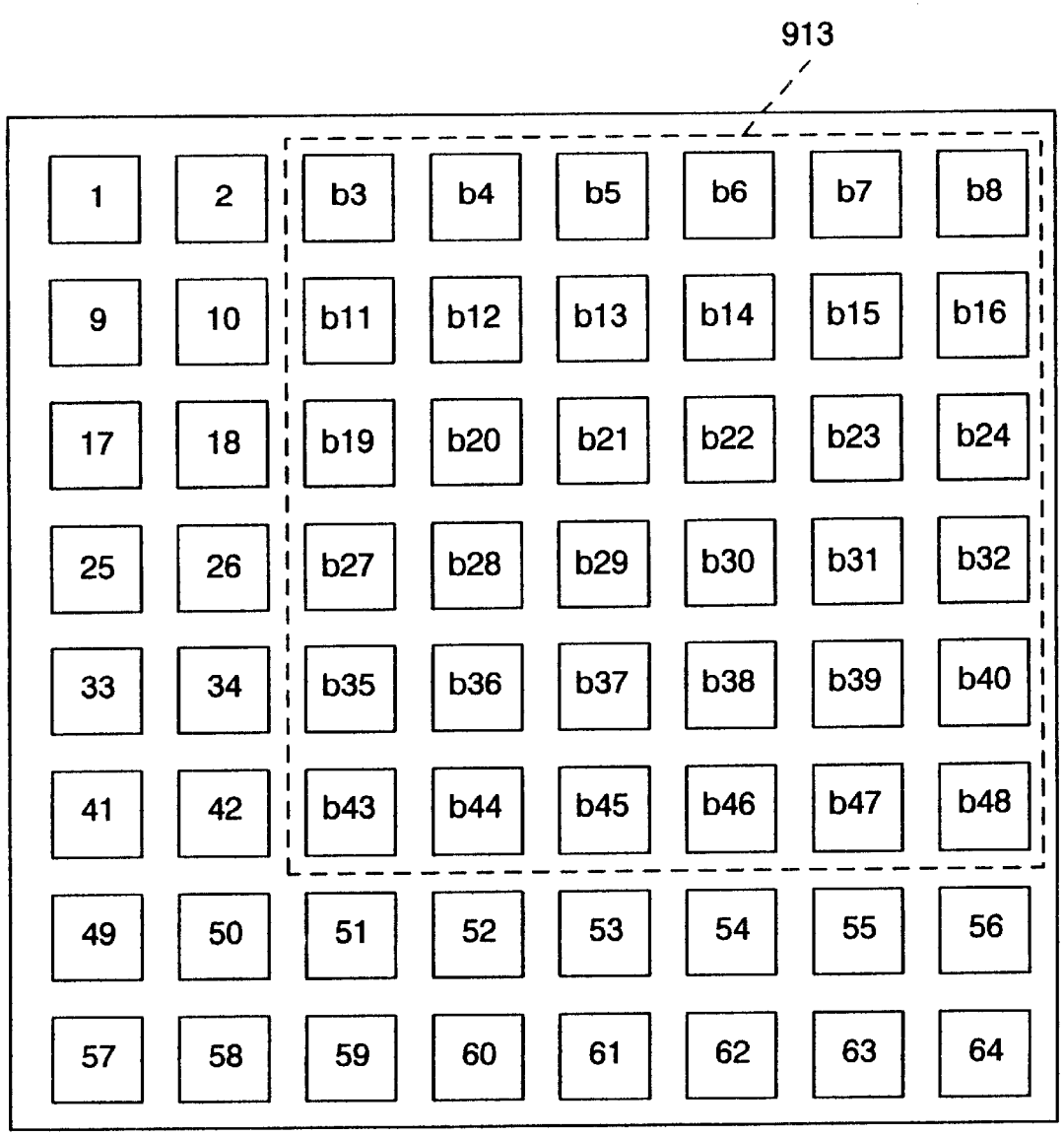
FIG. 9. is a diagram of the array capturing the b picture elements of the image.

When the image has been shifted by the wedge, it overlays the CCD cells labeled a1 through a46. These CCD cells are sampled and stored as described above and the image is again shifted, this time by rotation of the wedge approximately ninety degrees. After rotation of wedge 225 to approximately one hundred thirty five degrees, the image has been shifted as shown in FIG. 9. The amount of shift between FIG. 8 and FIG. 9 is one and one half times the lateral spacing between adjacent CCD cells. This distance can be described as an integer multiple of the lateral spacing between adjacent CCD cells minus a fraction of the lateral spacing between adjacent CCD cells. In this case, the integer is two and the fraction is one half. When the image has been shifted by the wedge, it overlays the array of CCD cells labeled b3 through b48. These CCD cells are sampled and stored in another memory area as described above.

Figure 10:
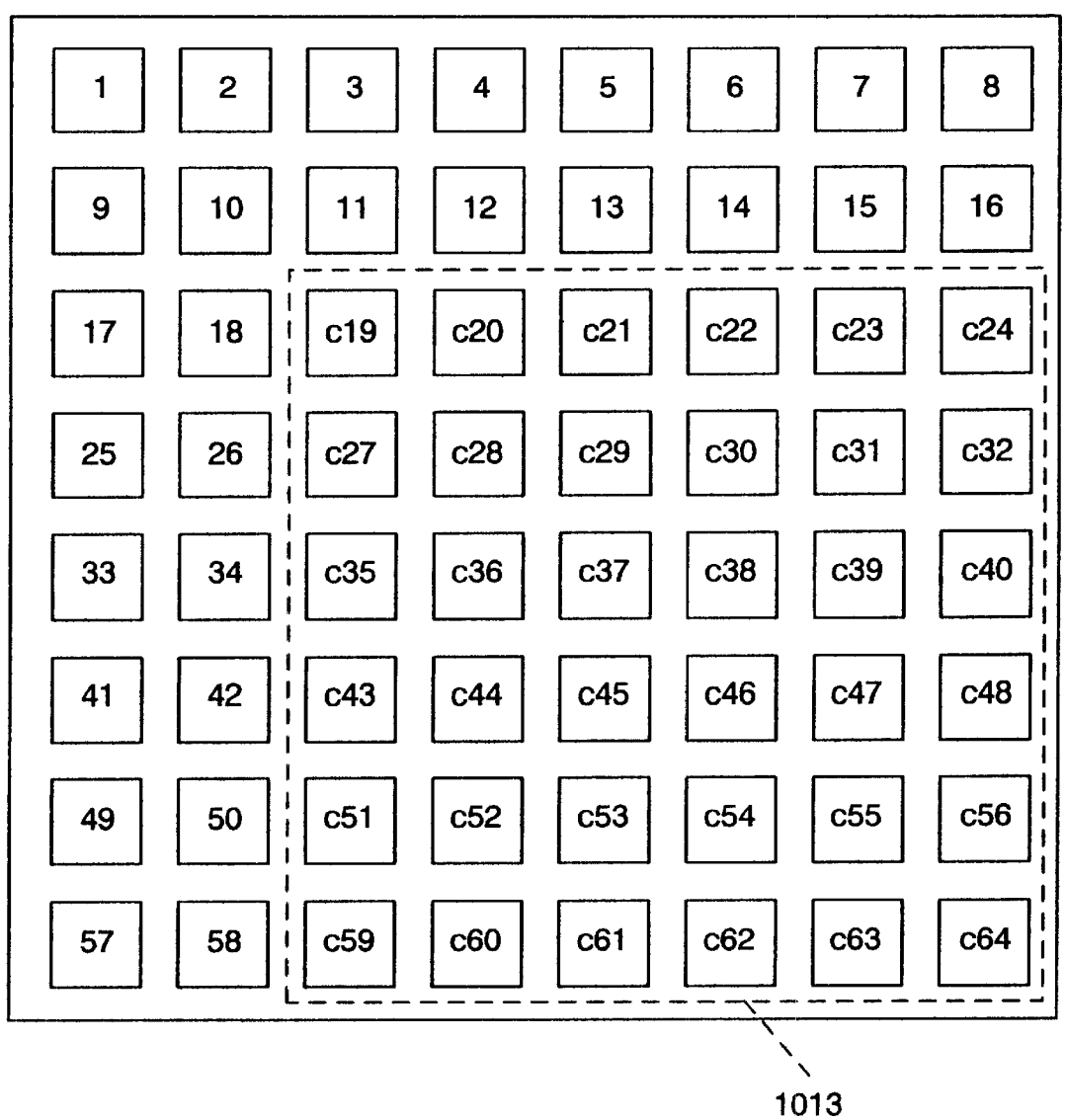
FIG. 10. is a diagram of the array capturing the c picture elements of the image.

After further rotation of wedge 225 to approximately two hundred twenty five degrees, the image has been shifted as shown in FIG. 10 by the broken line 1013. The amount of shift between FIG. 9 and FIG. 10 is one and one half times the lateral spacing between adjacent CCD cells. This distance can again be described as an integer multiple of the lateral spacing between adjacent CCD cells minus a fraction of the lateral spacing between adjacent CCD cells. Again, the integer is two and the fraction is one half. When the image has been shifted by the wedge, it overlays the array of CCD cells labeled c19 through b64. These CCD cells are sampled and stored in a third memory area as described above.

Figure 11:
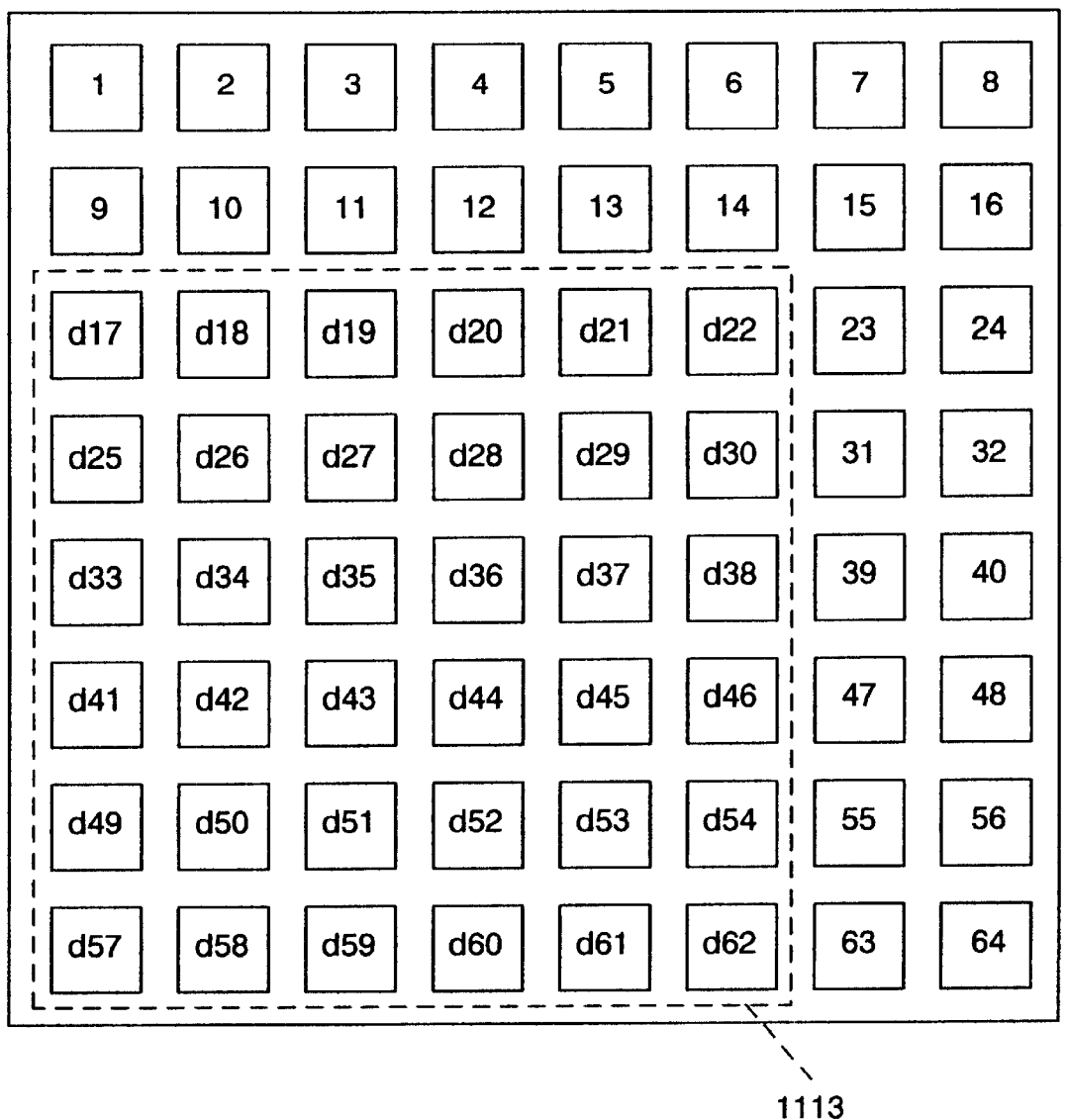
FIG. 11. is a diagram of the array capturing the d picture elements of the image.

After another rotation of wedge 225 to approximately three hundred fifteen degrees, the image has been shifted as shown in FIG. 11 by the broken line 1113. The amount of shift between FIG. 10 and FIG. 11 is again one and one half times the lateral spacing between adjacent CCD cells. This distance can again be described as an integer multiple of the lateral spacing between adjacent CCD cells minus a fraction of the lateral spacing between adjacent CCD cells. Again, the integer is two and the fraction is one half. When the image has been shifted by the wedge, it overlays the array of CCD cells labeled d17 through d62. These CCD cells are sampled and stored in a fourth memory area as described above.

Having captured four complete low resolution and overlapping images, these low resolution images are now interleaved by logic 219 as shown in the diagram of FIG. 12. Interleaving when images are shifted according to FIG. 7 is simple in that picture elements a1, b1, c1 and d1 are merely grouped together as shown in FIG. 7 to capture a high resolution image. When a larger wedge angle is employed as in FIGS. 8 through 11, the picture elements b1, b2 and a7, a8 are not available due to cropping. If they are not cropped, as they were in FIGS. 8 and 9, but allowed to capture picture elements, they may be retained as part of the final image. However, since a7, a8 and b1, b2 have no corresponding c and d picture elements they must remain part of low resolution image areas.

Referring now to FIG. 12, and recalling FIGS. 8, 9, 10 and 11, it is seen that a1, b3, d17 and c19 picture elements combine to increase the resolution at this portion of the image by four fold. This form of interleaving is more complex but still yields a cost effective way to achieve high resolution of document capture for use in such applications as teleconferencing and other similar applications.

In the above described embodiment, separate memory areas have been shown to aid in understanding the invention. It will be understood that the interleaving logic can be active with the capture logic to store each low resolution image as it is captured directly into appropriate memory locations such as are shown in FIG. 12. Of course each of the memory areas indicated in FIGS. 8 through 11 can be considered as overlapping memory areas. Further, the interleaving logic may operate directly to a display and/or communication network and the high resolution image may not need to be combined in memory at all.

Of course, many additional modifications and adaptations to the present invention can be made in both embodiment and application without departing from the spirit of this invention. For example, although optical wedge rotation is shown as clockwise, opposite rotation works as well. Further, the image may be shifted by a shuttered four facet wedge between the object and the lens. In such an embodiment, four adjacent fixed optical wedges and four optical shutters respectively achieve the actuation for shifting the image by opening only one shutter at a time. Accordingly, this description should be considered as merely illustrative of the principles of the present invention and not in limitation thereof.

We claim:

1. Image capture apparatus comprising:

an image capture array having a plurality of sensors, each sensor capturing a picture element of an image;

a lens for focusing an image of an object onto the image capture array;

an optical wedge assembly located between the object and the lens for displacing the image of the object on the image capture array to a first position on the array;

first memory area for holding first picture elements of the image captured from the image in the first position;

an actuator connected to the optical wedge assembly and moving the optical wedge assembly for displacing the image of the object on the image capture array to a second and overlapping position at a distance from the first position of an integer multiple minus a fraction of the distance between adjacent sensors in the array;

second memory area for holding second picture elements of the image captured from the image in the second position;

logic for interleaving the stored picture elements of the first memory with those of the second memory to provide a composite image at a resolution greater than the resolution of the first picture elements and the resolution of the second picture elements;

wherein the optical wedge assembly is a four facet shuttered optical wedge assembly and wherein the actuator moves the optical wedge assembly by opening one shutter at a time.

2. The apparatus of claim 1 further comprising:

a workstation having a stand for holding the apparatus in a first position in which low resolution images are adequate and for holding the apparatus in a second position in which high resolution images are required.

3. The apparatus of claim 2 wherein the workstation is a tele-conferencing station and the second position is a position for capturing images of documents.

* * * * *